US006511528B1

(12) United States Patent
Lansbarkis et al.

(10) Patent No.: US 6,511,528 B1
(45) Date of Patent: Jan. 28, 2003

(54) PURIFICATION OF CARBON DIOXIDE

(75) Inventors: James R. Lansbarkis, El Dorado; Jon S. Gingrich, Sacramento, both of CA (US)

(73) Assignee: UOP LLC, Des Plaines, IL (US)

( * ) Notice: Subject to any disclaimer, the term of this patent is extended or adjusted under 35 U.S.C. 154(b) by 0 days.

(21) Appl. No.: 09/503,654

(22) Filed: Feb. 14, 2000

Related U.S. Application Data

(60) Provisional application No. 60/126,490, filed on Mar. 26, 1999.

(51) Int. Cl.[7] .......................... B01D 53/04; B01D 53/26

(52) U.S. Cl. ............................ 95/118; 95/128; 95/135; 95/141; 95/902; 423/230

(58) Field of Search ................................ 423/220, 230, 423/437.1; 95/116–118, 135–138, 141–143, 128, 901, 902; 210/663, 690

(56) References Cited

U.S. PATENT DOCUMENTS 3,816,975 A 6/1974 Collins .......................... 55/33
4,425,143 A 1/1984 Nishizawa et al. ............ 55/31
4,784,672 A * 11/1988 Sircar .......................... 95/123
5,059,405 A * 10/1991 Watson et al. ................ 95/117
5,089,244 A 2/1992 Parent et al. ............... 423/347
5,146,039 A 9/1992 Wildt et al. ................. 585/820
5,181,942 A * 1/1993 Jain ............................. 95/45
5,248,888 A 9/1993 Yan ............................ 423/210
5,256,173 A 10/1993 Rastelli ........................ 95/141
5,271,760 A 12/1993 Markovs et al. .......... 95/134 X
5,271,914 A 12/1993 Sugimoto et al. ............. 95/141
5,417,950 A 5/1995 Sheu et al. ............... 95/902 X
5,425,929 A * 6/1995 van Oeveren et al. .. 423/243.01
5,451,249 A * 9/1995 Spiegel et al. ................ 95/117
5,531,809 A 7/1996 Golden et al. ............ 96/132 X
5,536,301 A 7/1996 Lansbarkis et al. ........... 95/117
5,557,030 A 9/1996 Markovs et al. ............ 585/826
5,580,370 A 12/1996 Kuma et al. .................. 96/154
5,609,842 A 3/1997 Tsybulevski et al. .. 423/244.11
5,620,502 A 4/1997 Dunne et al. ............. 95/902 X
5,674,463 A * 10/1997 Dao et al. ................... 423/230
5,810,910 A 9/1998 Ludwig et al. ........... 96/108 X
5,846,298 A 12/1998 Weist, Jr. .................. 95/902 X
5,858,068 A 1/1999 Lansbarkis et al. ....... 95/143 X
5,910,292 A 6/1999 Alvarez, Jr. et al. ...... 95/117 X
6,059,859 A * 5/2000 Alvarez, Jr. et al. .......... 95/118
6,074,459 A * 6/2000 Gingrich et al. .............. 96/135
6,099,619 A * 8/2000 Lansbarkis et al. ........... 95/118

FOREIGN PATENT DOCUMENTS

EP 0586830 3/1994
SU 1565498 5/1990

* cited by examiner

*Primary Examiner*—David A. Simmons
*Assistant Examiner*—Frank M. Lawrence
(74) *Attorney, Agent, or Firm*—John G. Tolomei; Frank S. Molinaro; Maryann Maas

(57) ABSTRACT

Commonly available carbon dioxide may contain unacceptable amounts of compounds containing greater than about ten carbon atoms, sulfur-containing materials, and nitrogen-containing materials which are particularly detrimental to semiconductor and silicon wafer processing-related uses of carbon dioxide. These impurities can be effectively removed by a combination of metal oxide, silica gel, and activated carbon, thus permitting an on-site, on-demand, convenient, and economic method of purifying carbon dioxide ranging from laboratory scale operations to tank car scale operations.

4 Claims, 4 Drawing Sheets

2
4
6
8
10
12
14
16
18
20
22
24

PURIFICATION OF CARBON DIOXIDE

CROSS REFERENCE TO RELATED APPLICATION

This application claims the benefit of priority of our co-pending Provisional Application Serial No. 60/126,490 filed Mar. 26, 1999.

FIELD OF THE INVENTION

The present invention relates to a process and apparatus for purifying carbon dioxide using a sequence of adsorbents including a metal oxide, silica gel, and activated carbon.

BACKGROUND OF THE INVENTION

Carbon dioxide has been known for centuries, with Pliny the Elder describing it in the context of poisonous vapors coming from caverns. In the seventeenth century, Van Helmont obtained carbon dioxide by such means as fermentation and acidification of carbonates, and also studied many of its properties. Later it was recognized as an acidic gas but it was not until the end of the eighteenth century that Lavoisier recognized it as a compound of carbon and oxygen of a given proportion.

Since mineral waters (solutions of carbon dioxide in water) were thought to have medicinal properties, there was from the onset an incentive to commercially exploit carbon dioxide. Farady made liquid and solid carbon dioxide using a hydraulic pump and studied solid carbon dioxide as a refrigerant. Its uses over time have proliferated to include such diverse applications as beverage carbonation, chemical manufacture, fire fighting, food freezing, greenhouses, oil well secondary recovery, as an atmosphere in welding, and even more recently in supercritical extraction processes.

The bulk of carbon dioxide is generated from ammonia and hydrogen plants as process gas carbon dioxide resulting from the reaction between hydrocarbons and steam. The carbon dioxide produced by such methods has a high purity but may contain, inter alia, traces of hydrogen sulfide, sulfur dioxide, and hydrocarbons including high molecular weight hydrocarbons from compression and pump oils which are particularly detrimental to its use in the semiconductor industry. Carbon dioxide use in the semiconductor and silicon wafer production industries has seen much recent growth. However, these industries require extremely pure carbon dioxide in order to ensure that the products do not become contaminated by impurities that might be present in the carbon dioxide. It is particularly important that compounds containing about ten or more carbon atoms be removed from the carbon dioxide, and most important the compounds containing greater than about 15 carbon atoms be removed. This application is primarily concerned with purification of carbon dioxide for use in the semiconductor and silicon wafer production industries, where high purity carbon dioxide is required.

The most commonly used purification method is treatment with potassium permanganate or potassium dichromate. Both potassium permanganate and potassium dichromate are active oxidizing agents, consequently scrubbing generally results in oxidation of unwanted materials. In the case of hydrogen sulfide as a contaminant, oxidation results in the formation of sulfur that is readily removed as a solid. Where it is necessary to also remove water from the carbon dioxide, a separate drying step over alumina has sometimes also been used. Nonetheless, the presence of residual impurities often remains a problem in providing even food-grade carbon dioxide which meets the Compressed Gas Association commodity specifications much less the particular needs of the semiconductor and silicon wafer production industries.

Although the commercial production of carbon dioxide has been ongoing for many years now, and although the purification of the carbon dioxide has been the subject of many efforts, nonetheless a truly high purity carbon dioxide is expensive to produce and not widely available. In answer to this need, the present invention uses a combination of adsorbents to very effectively and very efficiently remove impurities such as water, sulfur-containing compounds, nitrogen-containing compounds, and hydrocarbons. In particular, the present invention provides a combination of adsorbents that are uniquely suited to removing compounds containing greater than about ten carbon atoms.

SUMMARY OF THE INVENTION

The invention described within is a method of purifying liquid or gaseous carbon dioxide. In particular, the present invention is a process for preparing high purity carbon dioxide suitable for use in the semiconductor and silicon wafer production industries. An embodiment comprises passing gaseous carbon dioxide through one or more beds containing (1) a metal oxide, (2) silica gel, and (3) activated carbon. The silica gel may be commonly available silica get such as Grade 3, 8 mesh silica gel, or may be alumina- or magnesia- stabilized silica gel, mixtures thereof, or a bed of each type of silica gel may be used. In a more specific embodiment a molecular sieve such as 4A molecular sieve may be used as the first bed to remove water. In another specific embodiment, silicalite may be used as a bed to remove a wide variety of low molecular weight organic compounds and oxygen-containing compounds. More specific embodiments of the invention involve additional adsorbents such as ZSM-5, ZSM-12, ZSM-23, silver-exchanged faujasite, reduced metal on matrix material, and combinations thereof. Other embodiments and applications will be apparent from the ensuing description.

DESCRIPTION OF THE INVENTION

Figure 1:
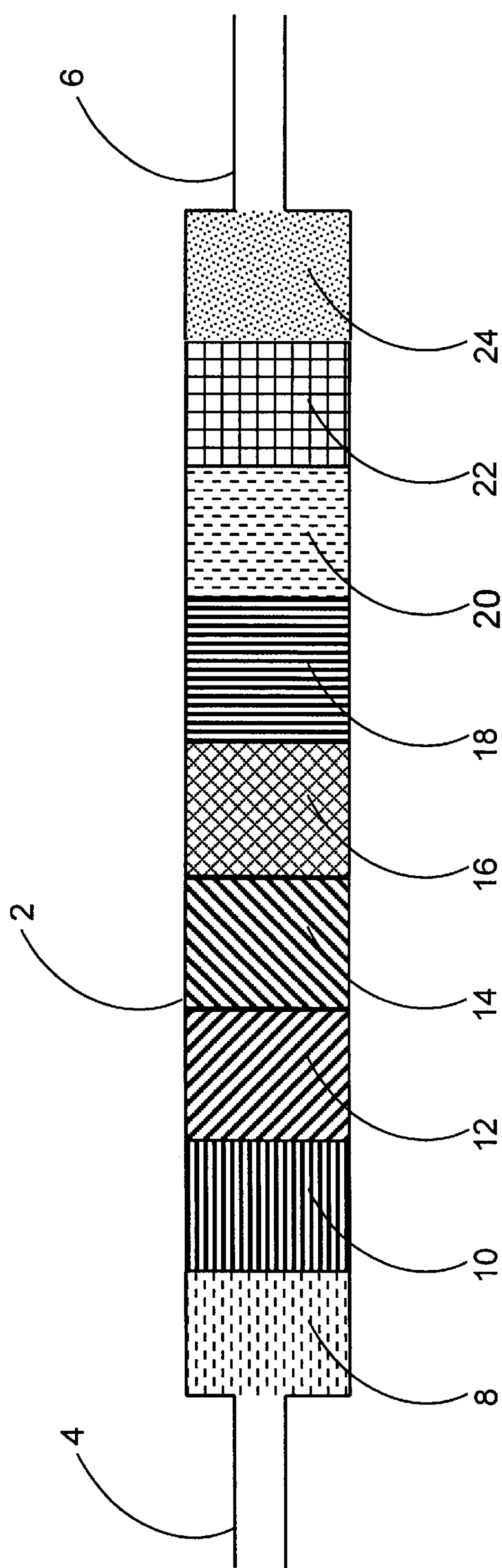
FIG. 1 is a simplified side view of the apparatus for purifying carbon dioxide. Additional pieces of apparatus that may be employed in connection with the apparatus of the invention are not shown.

The need for high purity carbon dioxide in the semiconductor and silicon wafer production applications has been recently growing. Such applications have unique requirements including that the carbon dioxide be essentially free of impurities that would contaminate the semiconductor and silicon wafer products. It is especially important in these applications that the carbon dioxide be free of compounds containing greater than about ten carbon atoms. Lube oils have been found to be a problematic contaminant of carbon dioxide since it is believed that lube oils having greater than about 10 carbon atoms may fold into configurations that prevents entry into the pores and hence adsorption by many molecular sieves. The present invention is a process for purifying gaseous or liquid carbon dioxide to sufficient levels so as to enable its use in the foregoing applications. The purification process of the present invention relies on a sequence of specific adsorbent beds including a metal oxide, silica gel, activated carbon, and optionally a 3A, 4A or 5A molecular sieve, and silicalite to remove, most importantly, compounds containing greater than about 10 carbon atoms and sulfur-containing compounds. The use of the additional adsorbents, e.g., zeolites such as 3A, 4A and 5A and silicalite, is optional but they may be employed to remove other impurities such as oxygen-containing compounds, water, and lower molecular weight hydrocarbons where desired. It is the unique combination of adsorbents in the present invention that is so effective to purify carbon dioxide as needed for the semiconductor and silicon wafer processing industries.

An advantage of the present method is that the purification is conveniently done on-site, on demand, and is conveniently scaled from relatively small to quite large amounts of carbon dioxide. For example, one may purify small quantities of carbon dioxide for laboratory use from a tank of carbon dioxide using a cartridge containing the materials described herein affixed to the tank outlet, with carbon dioxide being purified as it is drawn from the tank. At another end of the scale, carbon dioxide may be generated, and/or stored in large quantities on-site, then purified by passage through commensurately sized beds of adsorbent as described herein. The core advantage of the present invention in both cases is that carbon dioxide is purified as and when used, which is inherently a more efficient process of purification than one that purifies the carbon dioxide long before it is used.

The preferred adsorbent which serves to purify the carbon dioxide is the combination of a metal oxide, silica gel, and activated carbon. The metal oxide may be any metal oxide that is capable of reacting with sulfur containing compounds. Preferred metal oxides include molybdenum oxide and tungsten oxide. The metal oxide may be composited with or without a binder to form particle shapes known to those skilled in the art such as spheres, extrudates, rods, pills, pellets, tablets, or granules. Spherical particles may be formed directly by the oil-drop method or from extrudates by rolling extrudate particles on a spinning disk. The metal oxide may be a separate bed, or may be mixed with any of the adsorbents described below. When each of the adsorbents of the present invention are used as separate layers or beds, it is preferred that the metal oxide be positioned so that the carbon dioxide encounters the metal oxide prior to encountering the silica gel or activated carbon.

An example of a commonly available acceptable silica gel is Grade 3, 8 mesh silica gel readily available from sources such as Aldrich Chemical Company, Inc. Other acceptable silica gels include alumina- or magnesia-stabilized silica gel, also readily available from sources such as Aldrich Chemical Company. Magnesia-stabilized silica gel is also available under the name of Fluorosil. The invention may utilize only one type of silica gel, or preferably the invention may contain a bed of at least one Grade 3, 8 mesh silica gel and at least one alumina- or magnesia-stabilized silica gel. It is also contemplated that the invention may utilize a bed containing a mixture of two or more types of silica gel. As used herein, the general term "silica gel" is meant to include Grade 3, 8 mesh silica gel as well as alumina- or magnesia-stabilized silica gel. The activated carbon used in the present invention, may be any of the commonly-available activated carbon brands, such as Norit Calgon, Colonut Wood, and Sadinited Visis. A preferred weight ratio of metal oxide to silica gel to alumina is 1:4:4.

The foregoing adsorbents are well suited for the removal of compounds containing greater than about 10 carbon atoms and sulfur-containing compounds which are likely to be found as impurities in gaseous carbon dioxide. Impurities containing greater than about 10 carbon atoms are usually the result of contamination from compressor or pump oils. An example of a common contaminant that is successfully removed from carbon dioxide via the present invention is Windsor Lube oil, an oxygenated compound having 26 carbon atoms. Another example are the polychlorinated biphenyls or PCBs such as those found in lubricating or cutting oils.

We have also found that zeolites such as 3A, 4A, and 5A also may be optionally used as a guard bed or prebed, especially to remove other impurities such as water. Although less preferred, the zeolites such as 3A, 4A, and 5A may be mixed with or placed in sequence at any position before or after other above-described adsorbents. Whether yet other zeolites or molecular sieves such as are used in combination with the above-described metal oxide-silica gel-activated carbon adsorbent is largely a matter of choice and depends mainly upon the nature of the impurities to be removed from the carbon dioxide stream. Silicalite would be included in applications where it is desired to remove lower molecular weight compounds such as hydrocarbons or oxygen-containing compounds. When zeolites such as 3A, 4A, and 5A, or a mixture thereof, are employed in the present invention, it is preferred to position a bed of the 3A, 4A, and/or 5A zeolite so that the carbon dioxide passes through the 3A, 4A, and/or 5A zeolite prior to passing through any other adsorbent thereby preventing other adsorbents from needless contact with moisture.

A preferred embodiment of the invention is one where the first bed contains 4A molecular sieve, a second bed contains molybdenum oxide, a third bed contains alumina-stabilized silica gel, a fourth bed contains activated carbon, a fifth bed contains Grade 3, 8 mesh silica gel, and a sixth bed contains silicalite. It is further preferred that the weight ratio of the above beds is 1:1:2:4:2:1. However, the amount of each adsorbent used is determined by the particular application and the amount of each impurity present in the carbon dioxide.

It is preferred to activate the series of adsorbent beds prior to use. A preferred activation includes holding the adsorbents at 225° C. in a flowing nitrogen atmosphere for a time sufficient to deplete contaminants that may be adsorbed on the adsorbents. For a 2.7 liter volume of adsorbent, an activation time of about 4 hours is sufficient.

The present invention is carried out in a relatively uncomplicated way, merely by passing a stream of liquid or gaseous carbon dioxide through one or more beds of adsorbent. One may use only a single bed of a mixture of the adsorbents, a bed containing different adsorbents in layers, or one can use more than one bed, each of a particular adsorbent. It is also possible to practice the present invention using some combination of the foregoing. Which method is chosen is largely a matter of choice and the success of the present invention is generally not dependent thereon. It is preferred to use a cartridge containing layers of individual adsorbents with the cartridge being of a design for facile insertion into a carbon dioxide flow conduit. The resultant purified carbon dioxide is depleted in impurities such as water, compounds containing greater than ten carbon atoms, sulfur-containing compounds, nitrogen-containing compounds, oxygen-containing compounds and organic compounds. That is, the concentration of impurities in the resultant purified carbon dioxide is less than in carbon dioxide before it is purified by the present invention. As to the removal of oxygen-containing compounds, if the carbon dioxide being purified is in the liquid state, it is expected that oxygen-containing compounds containing 4 or more carbon atoms would be removed by the present invention.

It is expected that the invention will be most useful in the carbon dioxide in semiconductor and silicon wafer production applications, but other applications exist as well. The invention is also contemplated to be successful in the purification of carbon dioxide for use in the dry cleaning industry as well as for use in the food and beverage industry. However, the dry cleaning industry and the food and beverage industry have different concerns as to possible contaminants. Therefore, several other adsorbents may be combined with those already discussed above in order to more effectively remove the impurities of particular concern to these industries.

In one specific embodiment of the invention, preferred additional adsorbents which serves to purify the carbon dioxide are a silver-exchanged zeolite having a faujasite structure, an MFI-type molecular sieve, ZSM-12, or ZSM-23. It is particularly preferred to use the silver-exchanged zeolite having a faujasite structure in combination with one of the MFI-type molecular sieve, ZSM-12, or ZSM-23. The zeolite having a faujasite structure may be naturally occurring or a synthetic analog such as zeolite X and is referred to herein as a "faujasite". The faujasite may be silver exchanged to the extent of from about 5 up to about 90%. That is, from about 5 up to about 90 percent of the available sites in faujasite are exchanged with silver, which corresponds to material having 0.1–3 weight percent silver. A preferred silver-exchanged faujasite is silver-exchanged zeolite X. The molecular sieve may be one of the MFI-type molecular sieves with a Si:AI ratio of at least 10 (i.e., silica:alumina is at least 20) and preferably greater than about 20 such as ZSM-5 and silicalite. The molecular sieve adsorbent may also be ZSM-12 or ZSM-23. The foregoing adsorbents are well suited for the removal of sulfur-containing compounds, especially hydrogen sulfide, nitrogen-containing compounds, oxygen-containing compounds, and hydrocarbons which are likely to be found as impurities in gaseous carbon dioxide. As a class of hydrocarbons, alcohols are also readily removed by the additional adsorbents. The faujasite and molecular sieve may be used as a mixture of the two additional components, as a mixture with any of the above-described adsorbents, or as a sequence of separate beds. Molecular sieves with a pore diameter in the 4–6 angstrom range are especially suitable in the practice of this embodiment of the invention. It is possible to use solely the MFI-type molecular sieve or solely the silver-exchanged faujasite along with the above-described combination of adsorbents: the metal oxide, silica gel and activated carbon.

Similarly, in yet another embodiment of the invention, reduced metals, i.e., metals in the zero valent state, supported on a matrix material may be optionally employed in combination with any of the above embodiments of the invention to remove impurities such as oxygen to levels as low as, for example, less than 1 ppm oxygen. Preferred reduced metals include nickel and copper, with the most preferred being copper. Matrix materials may be a high surface area refractory inorganic oxide such as those commonly known in the art including silicas, aluminas, and zeolites. The silicas may be amorphous or crystalline, and examples of aluminas include gamma, theta, and delta. The preferred matrix material is alumina. Such matrix materials are well known to one skilled in the art and are not discussed in detail here; for reference see U.S. Pat. No. 5,659,099 hereby incorporated by reference. The reduced metal may be impregnated so as to result in a composite having from about 0.1 weight % to about 20 weight %, and preferably from about 0.1 weight % to about 10 weight %, of the metal deposited with high dispersion and even distribution throughout the matrix material, with the weight percent of reduced metal being measured as a percent of the composite. The reduced metal and matrix material may be composited with or without a binder to form particle shapes known to those skilled in the art such as spheres, extrudates, rods, pills, pellets, tablets, or granules. Spherical particles may be formed directly by the oil-drop method or from extrudates by rolling extrudate particles on a spinning disk. The reduced metal and matrix material may be a separate bed, or may be mixed with any of the above-described adsorbents. In an embodiment employing a silver-exchanged faujasite, a molecular sieve, and a reduced metal on a matrix material all as separate beds, it is preferred that the reduced metal on matrix material be positioned between the silver-exchanged faujasite and the molecular sieve.

Turning to FIG. 1, the apparatus of the invention is shown as a vessel 2 having a gas fluid inlet 4 and a gas fluid outlet 6. The vessel may be constructed of any suitable material able to conduct carbon dioxide at the flow rate and pressure of the particular application. The gas fluid inlet and outlet may further be equipped with connectors so that the apparatus may be readily placed in a flowing carbon dioxide stream. Furthermore, the gas fluid inlet and outlet may contain a retainer to prevent the solid contents of the vessel from being removed from the vessel. The first bed, 8, contains 3A, 4A, and 5A molecular sieves, 10 is a second bed containing metal oxide, 12 is a third bed containing aluminastabilized silica gel and magnesia-stabilized silica gel, 14 is a fourth bed containing activated carbon, 16 is a fifth bed containing silica gel, 18 is a sixth bed containing a MFI-type molecular sieve, ZSM-5, ZSM-12, ZSM-23 or combinations thereof, 20 is a seventh bed containing silver-exchanged faujasite, 22 is an eighth bed containing reduced metal on a matrix material and 24 is a ninth bed containing silicalite.

EXAMPLE

Two silicon wafers were each exposed to 1 kg of commercially purchased grade 5 carbon dioxide from the same cylinder. However, the first wafer (wafer 1) was exposed to carbon dioxide that was purified by passing the carbon dioxide through 2.8 L total volume of particles where the particles are 9% 4A molecular sieve, 9% of particles containing about 30% tungsten oxide and about 70% alumina, 18% silica-alumina, 38% activated carbon, 18% Grade 3 silica gel, and 8% silicalite prior to encountering the silicon wafer. The second wafer (wafer 2) was exposed to carbon dioxide directly from the cylinder of commercially purchased grade 5 carbon dioxide. A visual inspection of the two wafers after exposure to the carbon dioxide resulted in the observation of a thin film of deposit on wafer 2 which was exposed to carbon dioxide directly from the cylinder. No deposit was observed on the wafer 1 which was exposed to carbon dioxide that was first purified by passing the carbon dioxide through the 2.8 L of particles prior to encountering the silicon wafer.

Wafer 1 and wafer 2 described above were further analyzed using a solvent wash followed by gas chromatography-mass spectroscopy (GC-MS). A solvent containing 10 percent methanol in methylene chloride was prepared. A 5 mL aliquot of the solvent was used to wash wafer 1 and another 5 mL aliquot of the solvent was used to wash wafer 2. The wafer rinsings were then concentrated by evaporation with nitrogen gas A solvent blank was also processed in the same manner as the samples.

Figure 2:
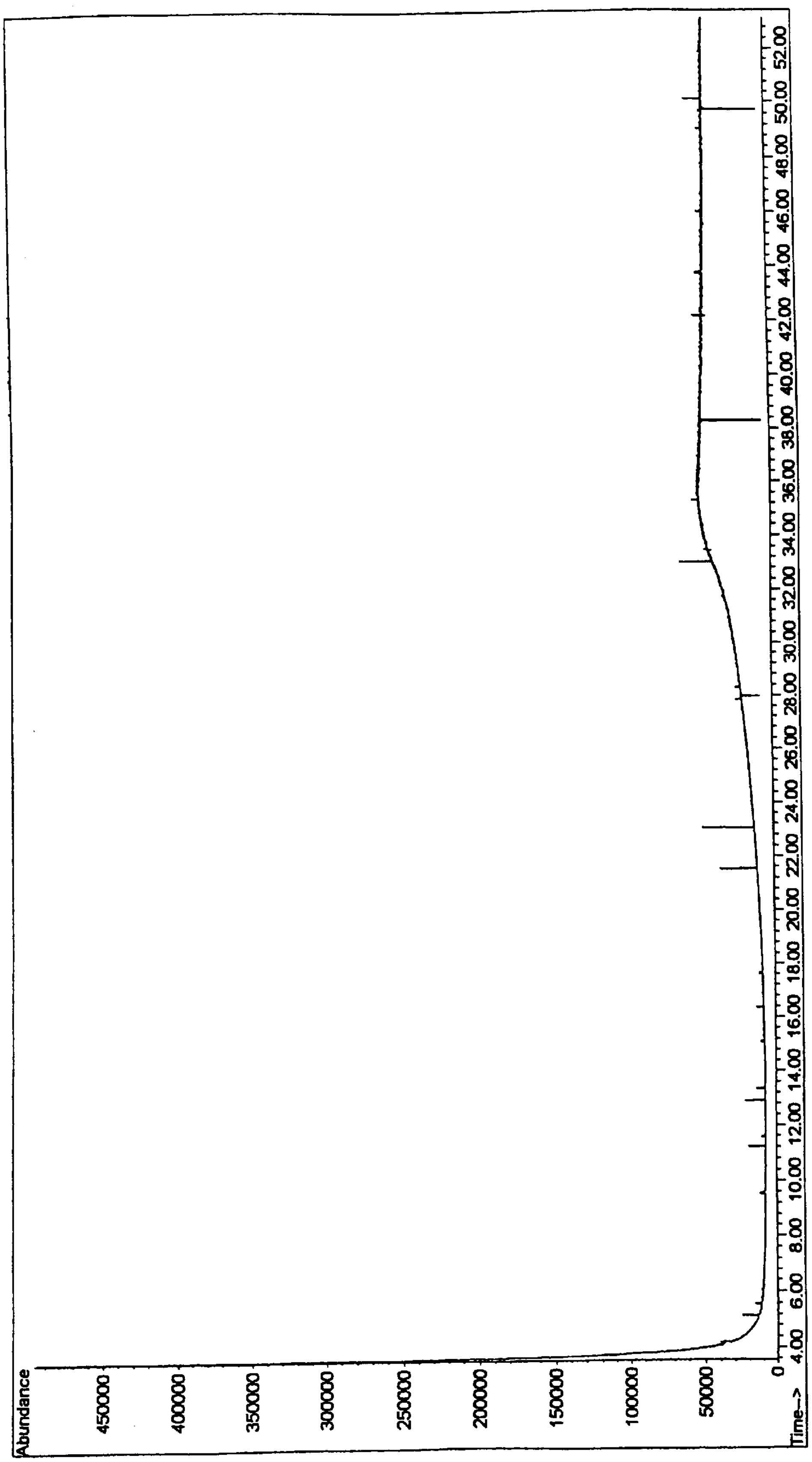
FIG. 2 is a chromatogram of a solvent blank as described in the Example.
Figure 3:
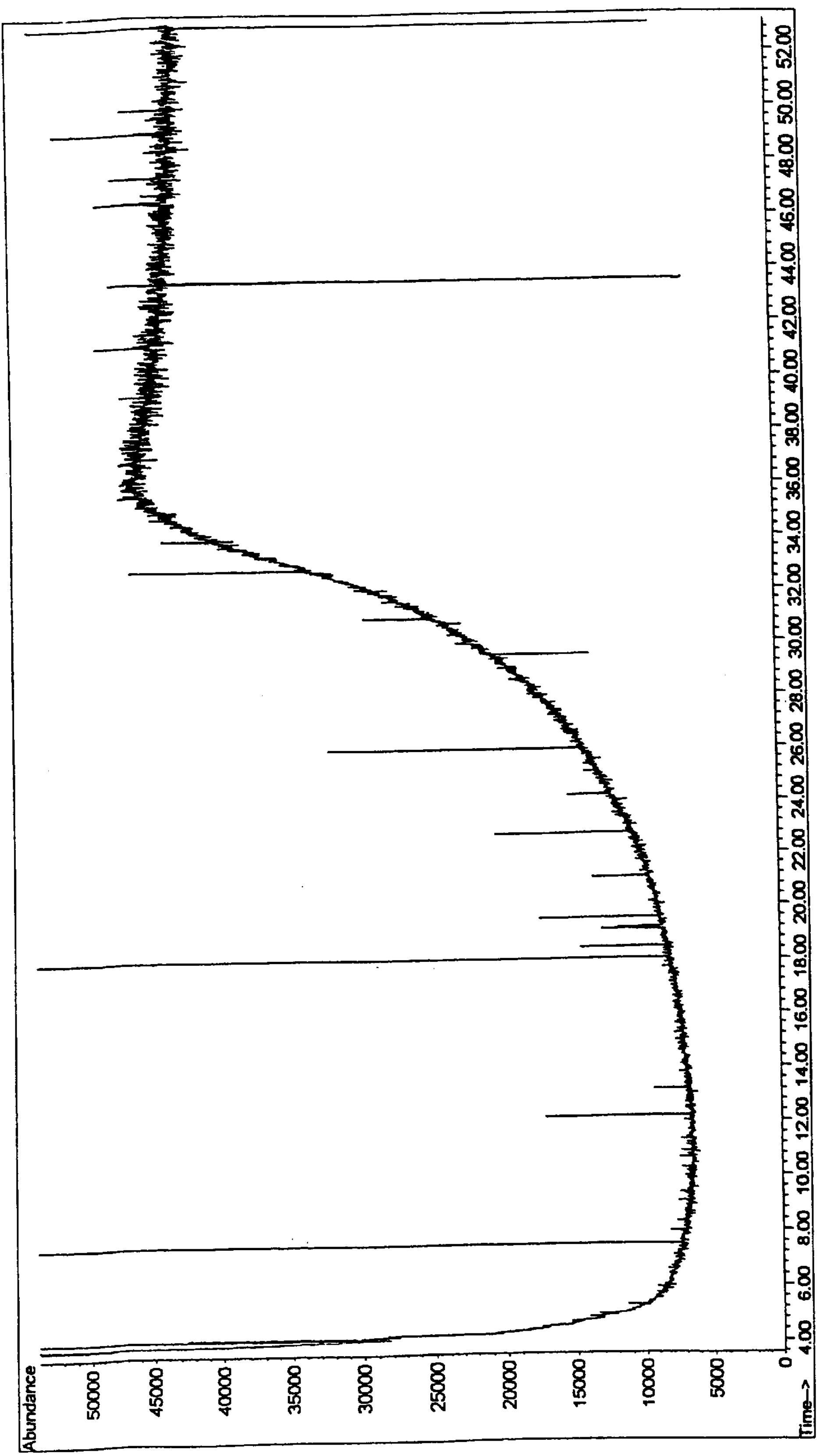
FIG. 3 is a chromatogram of a solvent wash of a silicon wafer exposed to carbon dioxide that has been purified according to the present invention as described in the Example.
Figure 4:
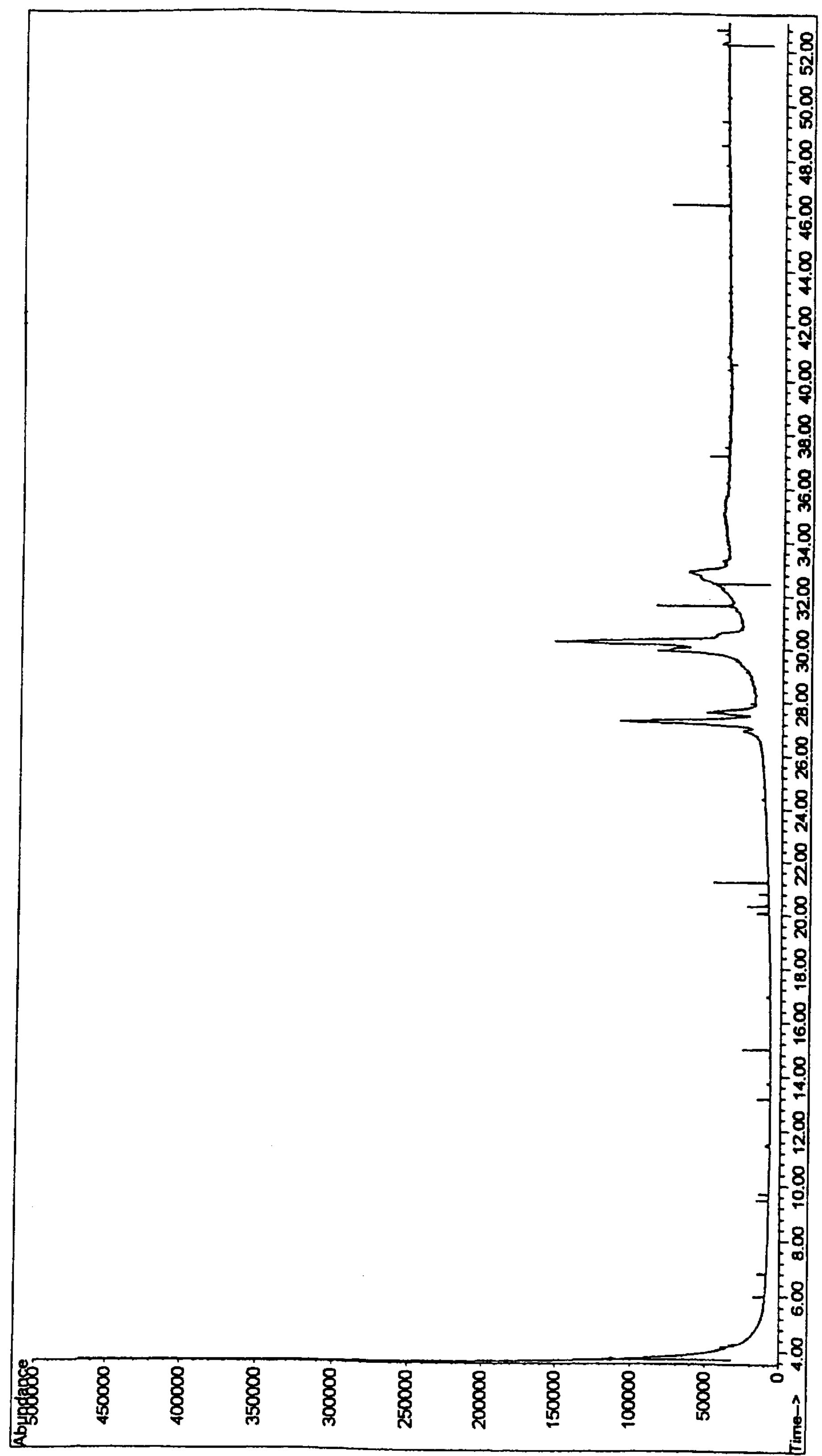
FIG. 4 is a chromatogram of a solvent wash of a silicon wafer exposed to carbon dioxide as described in the Example.

The concentrated extracts were analyzed by GC-MS using a boiling point type column. The oven was ramped from 100° C. to 325° C. at 8° C. per minute. The resulting chromatograms are provided in FIGS. 2–4. FIG. 2 is the chromatogram resulting from the solvent blank, and no contaminates are detected. FIG. 3 is the chromatogram resulting from the solvent wash of wafer 1. The spikes shown in FIG. 3 are due to electrical noise and FIG. 3 shows no contaminate peaks. FIG. 4 is the chromatogram resulting from the solvent wash of wafer 2. Note that several large peaks are shown. A comparison of FIG. 3 and FIG. 4 reveals that wafer 1 yielded no detectable contaminates into the solvent wash while wafer 2 yielded at least three detectable contaminates into the solvent wash. The data demonstrates the effectiveness of purifying carbon dioxide by passing the carbon dioxide through the specified particles prior to contact with silicon wafers.

What is claimed is:

1. A method of purifying gaseous carbon dioxide comprising passing a stream of carbon dioxide through (a) a zeolite selected from the group consisting of 3A, 4A, 5A and combinations thereof, (b) a metal oxide, (c) a silica gel selected from the group consisting of alumina-stabilized silica gel, magnesia-stabilized silica gel, and the combination thereof, (d) activated carbon, (e) silica gel and (f) silicalite, and recovering purified carbon dioxide.

2. The method of claim 1 wherein the metal oxide is selected from the group consisting of molybdenum oxide and tungsten oxide.

3. The method of claim 1 wherein the purified carbon dioxide is depleted in water, compounds containing greater than about 10 carbon atoms, sulfur-containing compounds, nitrogen-containing compounds, oxygen-containing compounds and organic compounds.

4. A method of purifying gaseous carbon dioxide comprising passing a stream of carbon dioxide through (a) a zeolite selected from the group consisting of 3A, 4A, 5A and combinations thereof, (b) a metal oxide, (c) a silica gel selected from the group consisting of alumina-stabilized silica gel, magnesia-stabilized silica gel, and the combination thereof, (d) activated carbon, (e) silica gel (f) a zeolite selected from the group consisting of silicalite, ZSM-5, ZSM-12, ZSM-23 and combinations thereof, (g) a silver-exchanged faujasite, and (h) a reduced metal on a matrix material, and recovering purified carbon dioxide.

* * * * *